Patented Apr. 26, 1949

2,468,448

UNITED STATES PATENT OFFICE 2,468,448

NONCAKING COMPOSITION

Charles S. King, Joliet, Ill., assignor to Blockson Chemical Co., Joliet, Ill., a corporation of Illinois No Drawing. Application March 29, 1946, Serial No. 658,225

12 Claims. (Cl. 252—135)

The present invention relates to certain mixtures of ingredients in powder form which tend to cake, and to the avoidance of caking. It has special reference to mixtures containing silica and trisodium phosphate.

There are on the market many compounds containing trisodium phosphate which is a mild alkali. These are used as cleaning compounds, and in order to give a scouring property to the compound, finely divided abrasives are often added. When silica is present, there is a tendency for the powder mixture to cake.

In U. S. Patent No. 2,130,869 issued to Block and Metziger, this caking problem and a solution thereof are disclosed. It is there disclosed that when various aluminum compounds in small amount are distributed throughout the mixture, caking is inhibited. The caking is there attributed to a reaction, induced by moisture, especially that taken up from the atmosphere, between silica and alkali, which latter derives from the solid normal phosphate salt of alkali-metal, to form water-soluble alkali-metal silicate, which is active as a binder for the particles. Effective aluminum compounds, as solid particles, seemingly react with water-soluble alkali-metal silicate as fast as it forms, with a resulting formation of insoluble and non-adhesive aluminum silicate. Aluminum hydrate is a highly effective agent for the purpose. Aluminum phosphate in chemically precipitated and uncalcined forms is also effective, but its refractory and calcined forms are substantially inactive to minimize or prevent caking.

Insofar as this applicant is now informed, no agents for like function have heretofore been known beyond the effective aluminum compounds. The present invention is based upon the discovery of a non-aluminum compound which is not only active to minimize, but active to prevent the described caking when the compound is in a hydrated form, and inactive when in its anhydrous form.

It is the general object of the present invention to provide a new agent for minimizing the tendency to cake of a powdery mixture of silica and normal alkali-metal orthophosphate.

It is a particular object of the present invention substantially to prevent the caking of scouring powders comprising essentially silica and normal alkali-metal orthophosphate, under the conditions commercially encountered in getting packages of such materials to the consumer, usually a householder, and under the conditions usually encountered in the household.

It is a particular object of the invention to employ a hydrated normal magnesium orthophosphate salt as a caking inhibitor for scouring powders comprising essentially silica and trisodium phosphate.

Numerous other and ancillary objects and advantages of the invention will become apparent from the following description and explanation of the invention.

Since the advent of the invention of said Patent No. 2,130,869, aluminum hydroxide (alumina hydrate) has been considered the most effective caking inhibitor. It is highly successful in small amount, but there are conditions (shown hereinafter) under which its effectiveness is decreased, especially as the content of it in the composition and the humidity encountered are increased. The hydrated trimagnesium orthophosphates of the present invention do not exhibit these characteristics.

The preferred hydrated trimagnesium orthophosphates are effective at various concentrations at high and low temperatures and at high and low humidities, and that effectiveness is one of substantial prevention of caking. An inhibitor which minimizes caking without substantial prevention, is, in commercial considerations, an inoperable and unsuccessful agent, because any householder purchasing a package of the material in retail trade, must not find the contents partially caked and unshakable from the sifting top commonly provided as part of the container.

It is not said here that hydrated trimagnesium phosphate is the only agent other than aluminum compounds which is effective merely to minimize caking. Various compounds of aluminum and of magnesium have been found to be effective minimizers of caking, but no compound other than hydrated trimagnesium orthophosphate has been found adequate for substantial prevention of caking under conditions of normal commercial and normal domestic exposures, and over a wide range of usages.

The chemical literature gives a wide range for content of water in hydrated crystals of trimagnesium orthophosphate. Per mole of $Mg_3(PO_4)_2$, the moles of crystal water are given as 3, 4, 5, 7, 8 and 22. The C. P. grade has 4 moles of $H_2O$, and the technical grade has 5 moles of $H_2O$. For the purposes of the present invention other hydrates have been formed, in particular one having 1.33 moles of $H_2O$. Higher hydrates may be readily reduced to lower hydrates merely by heating. Hence, the higher hydrates may be used in the present invention, when the heat to which the composition is likely to be subjected, will not be such as to liberate water. For all commercial and practical purposes the 8-$H_2O$ hydrate is free from such danger. As to the higher hydrates, they may be used where they are effective to minimize or prevent caking under conditions maintaining stability of the hydrate.

The only measure for comparison of prospective agents is an arbitrary procedure. For the purposes of discovery and comparison, and for the purposes of the present application, the following procedure has been used.

A base mixture, or control, is used consisting by weight of 75% silica and 25% trisodium phosphate. The mixture is like the commercial product and in granulation is such that at least about 60% passes a 400 mesh screen, and at least about 90% passes a 200 mesh screen.

In using various contents of test agent, the test agent is substituted for silica. For example, a 1% usage of test agent indicates a test mixture consisting of 74% silica, 25% trisodium phosphate, and 1% test agent.

The test agent is reduced to a test granulation of substantially 325 mesh, to eliminate granulation as a variable.

A test portion of the test mixture is placed in a Petri dish at a test temperature T° for H hours at relative humidity R. H., followed by exposure to substantially normal room conditions (living, office or laboratory quarters) for E hours.

The sample is removed from the Petri dish to a 20 mesh screen which is shaken by a standardized movement for 1 minute. The per cent of the composition retained on the screen is the figure indicating the degree of imperfection of the test agent as a caking minimizer or preventative. A finite value indicates minimizing without prevention. The value zero indicates perfection for the test conditions. But the value zero under one set of conditions might be changed to a finite value for more drastic exposure to caking-inducing conditions.

Table A gives comparative results for light alumina hydrate (53% loss on ignition) and for various hydrates of trimagnesium orthophosphate. The test conditions set forth in Table A are those referred to above. Each example in Table A is designated by an "item number, for reference.

TABLE A

*Showing effectiveness of test agents*

[H=16 hours. E=24 hours]

| Item No. | Test Agent | Per Cent Usage | Test Result | Other conditions Varied | |
|---|---|---|---|---|---|
| | | | | T° F. | Per Cent R. H. |
| 1 | none | | 70 | 140 | 60 |
| 2 | do | | 65 | 140 | 60 |
| 3 | do | | 74.5 | 140 | 60 |
| 4 | $Mg_3(PO_4)_2.5H_2O$ | .5 | 0 | 140 | 60 |
| 5 | do | 1.0 | 0 | 140 | 60 |
| 6 | do | 2.0 | 1 | 140 | 60 |
| 7 | Alumina Hydrate | .5 | 0 | 140 | 60 |
| 8 | do | 1.0 | 0 | 140 | 60 |
| 9 | do | 2.0 | 2.5 | 140 | 60 |
| 10 | none | | 70 | 140 | 60-65 |
| 11 | $Mg_3(PO_4)_2.5H_2O$ | 1.0 | 0 | 140 | 60-65 |
| 12 | none | | 62 | 140 | 65 |
| 13 | do | | 65 | 140 | 65 |
| 14 | do | | 72 | 140 | 65 |
| 15 | do | | 70 | 140 | 65 |
| 16 | $Mg_3(PO_4)_2.5H_2O$ | .5 | 0 | 140 | 65 |
| 17 | do | .5 | 1 | 140 | 65 |
| 18 | do | .5 | 0 | 140 | 65 |
| 19 | do | .5 | 0 | 140 | 65 |
| 20 | do | 1.0 | 0 | 140 | 65 |
| 21 | do | 1.0 | 0 | 140 | 65 |
| 22 | do | 1.0 | 0 | 140 | 65 |
| 23 | do | 1.0 | 0 | 140 | 65 |
| 24 | do | 2.0 | 0 | 140 | 65 |
| 25 | do | 2.0 | 0 | 140 | 65 |
| 26 | do | 2.0 | 0 | 140 | 65 |
| 27 | do | 2.0 | 0 | 140 | 65 |
| 28 | Alumina Hydrate | .5 | 0 | 140 | 65 |
| 29 | do | .5 | 0 | 140 | 65 |
| 30 | do | .5 | 0 | 140 | 65 |
| 31 | do | .5 | 2 | 140 | 65 |
| 32 | do | 1.0 | 5.5 | 140 | 65 |
| 33 | do | 1.0 | 0 | 140 | 65 |
| 34 | do | 1.0 | 46.5 | 140 | 65 |
| 35 | do | 1.0 | 1 | 140 | 65 |
| 36 | do | 2.0 | 64 | 140 | 65 |
| 37 | do | 2.0 | 9 | 140 | 65 |
| 38 | do | 2.0 | 83 | 140 | 65 |
| 39 | do | 2.0 | 17 | 140 | 65 |
| 40 | $Mg_3(PO_4)_2$ | 1.0 | 50 | 140 | 60-65 |
| 41 | $Mg_3(PO_4)_2.1.33H_2O$ | 1.0 | 0 | 140 | 60-65 |
| 42 | $Mg_3(PO_4)_2.4H_2O$ | 1.0 | 2 | 140 | 60-65 |
| 43 | $Mg_3(PO_4)_2.5H_2O$ | 1.0 | 0 | 140 | 60-65 |
| 44 | $Mg_3(PO_4)_2.8H_2O$ | 1.0 | 0 | 140 | 60-65 |

It will be observed that $Mg_3(PO_4)_2.5H_2O$ at low usage of 0.5% (items 4, and 16 through 19) is a substantially perfect caking-preventer, and comparable to the alumina hydrate at .5% usage (items 7, and 28 through 31). It is seen that at 1% and 2% usages of alumina hydrate, there is substantially perfect prevention at 60% R. H. in the test (items 8 and 9), but at 65% R. H. (items 32 through 39) its action is erratic and unsatisfactory.

However, $Mg_3(PO_4)_2.5H_2O$ at 1% and 2% usages and at 65% R. H. (items 11, and 20 through 27) is still a substantially perfect caking preventer, as both it and alumina hydrate are at only .5% usage.

The technical grade having $5H_2O$ is the preferred agent, but the invention is by no means limited to it. When the $Mg_3(PO_4)_2.5H_2O$ is calcined to anhydrous state, it is not a preventer and is not an inhibitor. However, when $$Mg_3(PO_4)_2 \cdot 5H_2O$$

is heated for 3 hours at 250° C. it loses water and retains about 1.33 moles of crystal water, which hydrate salt is an effective preventer. Hydrated forms from said partly dehydrated salt of $$1.33\ H_2O\ up\ to\ Mg_3(PO_4)_2 \cdot 8H_2O$$

are also effective preventers. This is shown by actual tests in items 40 through 44 of Table A. Item 40 shows the anhydrous form to be ineffective.

Pound packages of cardboard or fiber material, of the compositions of Items 1 through 9, and 12 through 39, have been tested like the Petri dish samples, but at 104° F. and 85% R. H. Results have been of the same order as for the Petri dish samples secured at 140° F. and 60% to 65% R. H. The same perfections and the same erratic results were obtained.

The invention may be practiced with modified compositions containing the basic ingredients of silica and normal alkali metal orthophosphate. Numerous commercial mixtures of the basic ingredients are modified by addition agents, for example, wetting agents, detergent soap, and detergent chemicals. These addition agents to a slight degree may act as inhibitors of caking, but not to the extent of giving substantial prevention. In the Table B below, there is given as a standard the basic composition of 75% trisodium orthophosphate (TSP) and 25% silica. Also there are three pairs of modifications of the basic composition, each pair having some of either one or both of the basic ingredients replaced by added material. One member of the pair has a modifying agent representative of one of the common addition agents: wetting agent, detergent soap, and detergent chemical, but without the anti-caking agent of the present invention. The second member of the pair adds to the first member, in replacement of silica, 2% of $$Mg_3(PO_4)_2 \cdot 5H_2O$$

referred to in the table as "anti-caker". In the table, the term "wetting agent" refers specifically to an aryl alkyl sulfonate of the NACCONOL type (National Aniline and Chemical Company, New York city); the term "detergent soap" refers to common anhydrous sodium soap of animal fatty acids; and the term "modified soda" refers to a composition:

$$60\%\ Na_2CO_3 - 27\%\ NaHCO_3 - 13\%\ H_2O$$

well-known as a commercial product.

TABLE B

Referring to standardized test for Table A:
H = 16 hours
E = 24 hours
Temperature (T °F.) = 140° F.
Relative humidity (per cent R. H.) = 60%

| Pairs and Item No. | Per Cent Composition (By Weight) | | | | Test Result |
|---|---|---|---|---|---|
| | TSP | Silica | Anti-Caker | Addition Agent | |
| Pair A: | | | | | |
| Item 45 | 25 | 75 | -------- | -------------------- | 70 |
| Item 46 | 25 | 73 | 2 | -------------------- | 0 |
| Pair B: | | | | | |
| Item 47 | 25 | 73 | -------- | 2 (wetting agent) | 44 |
| Item 48 | 25 | 71 | 2 | 2 (wetting agent) | 0 |
| Pair C: | | | | | |
| Item 49 | 25 | 73 | -------- | 2 (detergent soap) | 45.5 |
| Item 50 | 25 | 71 | 2 | 2 (detergent soap) | 0 |
| Pair D: | | | | | |
| Item 51 | 20 | 75 | -------- | 5 (modified soda) | 54.5 |
| Item 52 | 20 | 73 | 2 | 5 (modified soda) | 1.5 |

In the Table B, it will be seen that each of the addition agents lessens the caking of the basic composition, but not to the point of substantial prevention. The presence of these addition agents does not alter the anti-caking effect of the hydrated trimagnesium orthophosphate.

In actual practice of the invention the inhibitor may be present in amount according to its granulation. For commercial scouring powders .5% usage at a mesh from 200 to 400 is effective as a preventer as herein set forth.

It is to be understood that trisodium phosphate is obtainable in varying degrees of solubility and with varying impurities. When its crystals are formed, they have a strong tendency to carry into the crystals, other chemicals associated with them in the liquor. Thus, some contain under 5% of sodium fluoride, sodium borate, sodium nitrate, or sodium hydroxide. One form containing about 4% of sodium fluoride, is not readily soluble. One containing caustic soda, a form commonly used for silica base cleaning mixtures, is very likely to form cake with great rapidity, and therefore, the invention is particularly advantageous in permitting use of such material, and in permitting fine-grinding of it for the powder mixture.

Accordingly the invention contemplates various embodiments or compositions which contain any cakable mixture of trisodium phosphate, and its less commonly used equivalent in the other alkali metals, potassium, lithium, etc., silica, and one or more hydrated forms of trimagnesium phosphate, as defined in the appended claims.

I claim:
1. The method of minimizing caking under normal conditions of exposure of a powdery physical mixture of particles of silica and particles of normal orthophosphate salt of alkali metal, which comprises thoroughly dispersing throughout the mixture a small quantity of particles of hydrated trimagnesium orthophosphate which is stable under said conditions of exposure and which is active to prevent in its immediate vicinity the formation of an adhesive substance causing caking, said adhesive being normally caused by interaction of silica and alkaline compound derived from said normal alkali-metal orthophosphate particles.

2. The method of minimizing caking under normal conditions of exposure of a powdery physical mixture of particles of silica and particles of normal orthophosphate salt of alkali metal, which comprises thoroughly dispersing throughout the mixture a small quantity of particles of hydrated trimagnesium orthophosphate which has water of constitution in the range from 1.33 to 8 moles per mole of $Mg_3(PO_4)_2$, and which is active to prevent in its immediate vicinity the formation of an adhesive substance causing caking, said adhesive being normally caused by interaction of silica and alkaline compound derived from said normal alkali-metal orthophosphate particles.

3. The method of minimizing caking under normal conditions of exposure of a powdery physical mixture of particles of silica and particles of normal orthophosphate salt of alkali metal, which comprises thoroughly dispersing throughout the mixture a small quantity of particles of hydrated trimagnesium orthophosphate pentahydrate which is active to prevent in its immediate vicinity the formation of an adhesive substance causing caking, said adhesive being normally caused by interaction of silica and alkaline compound derived from said normal alkali-metal orthophosphate particles.

4. The method of minimizing caking under normal conditions of exposure of a powdery physical mixture of particles of silica and particles of normal sodium orthophosphate, which comprises thoroughly dispersing throughout the mixture a small quantity of particles of hydrated trimagnesium orthophosphate which is stable under said conditions of exposure and which is active to prevent in its immediate vicinity the formation of an adhesive substance causing caking, said adhesive being normally caused by interaction of silica and alkaline compound derived from said normal sodium orthophosphate particles.

5. The method of minimizing caking under normal conditions of exposure of a powdery physical mixture of particles of silica and particles of normal sodium orthophosphate, which comprises thoroughly dispersing throughout the mixture a small quantity of particles of hydrated trimagnesium orthophosphate which has water of constitution in the range from 1.33 to 8 moles per mole of $Mg_3(PO_4)_2$, and which is active to prevent in its immediate vicinity the formation of an adhesive substance causing caking, said adhesive being normally caused by interaction of silica and alkaline compound derived from said normal sodium orthophosphate particles.

6. The method of minimizing caking under normal conditions of exposure of a powdery physical mixture of particles of silica and particles of normal sodium orthophosphate, which comprises thoroughly dispersing throughout the mixture a small quantity of particles of hydrated trimagnesium orthophosphate pentahydrate which is active to prevent in its immediate vicinity the formation of an adhesive substance causing caking, said adhesive being normally caused by interaction of silica and alkaline compound derived from said normal sodium orthophosphate particles.

7. A substantially non-caking powdery mixture comprising as the essential ingredients particles of silica, particles of normal orthophosphate salt of alkali metal, and a small quantity of particles of hydrated normal trimagnesium orthophosphate which is stable under the conditions of exposure of the mixture and which is active to prevent in its immediate vicinity the formation of an adhesive substance which is the cause of caking, said adhesive substance being normally formed by interaction between particles of the said normal alkali-metal orthophosphate.

8. A substantially non-caking powdery mixture comprising as the essential ingredients particles of silica, particles of normal orthophosphate salt of alkali metal, and a small quantity of particles of hydrated normal trimagnesium orthophosphate which has water of constitution in the range from 1.33 to 8 moles per mole of $Mg_3(PO_4)_2$, and which is active to prevent in its immediate vicinity the formation of an adhesive substance which is the cause of caking, said adhesive substance being normally formed by interaction between silica and alkaline compound derived from particles of the said normal alkali-metal orthophosphate.

9. A substantially non-caking powdery mixture comprising as the essential ingredients particles of silica, particles of normal orthophosphate salt of alkali metal, and a small quantity of particles of hydrated normal trimagnesium orthophosphate pentahydrate which is active to prevent in its immediate vicinity the formation of an adhesive substance which is the cause of caking, said adhesive substance being normally formed by interaction between silica and alkaline compound derived from particles of the said normal alkali-metal orthophosphate.

10. A substantially non-caking powdery mixture comprising as the essential ingredients particles of silica, particles of normal sodium orthophosphate, and a small quantity of particles of hydrated normal trimagnesium orthophosphate which is stable under the conditions of exposure of the mixture and which is active to prevent in its immediate vicinity the formation of an adhesive substance which is the cause of caking, said adhesive substance being normally formed by interaction between silica and alkaline compound derived from particles of the said normal sodium orthophosphate.

11. A substantially non-caking powdery mixture comprising as the essential ingredients particles of silica, particles of normal sodium orthophosphate, and a small quantity of particles of hydrated normal trimagnesium orthophosphate which has water of constitution in the range from 1.33 to 8 moles per mole of $Mg_3(PO_4)_2$, and which is active to prevent in its immediate vicinity the formation of an adhesive substance which is the cause of caking, said adhesive substance being normally formed by interaction between silica and alkaline compound derived from particles of the said normal sodium orthophosphate.

12. A substantially non-caking powdery mixture comprising as the essential ingredients particles of silica, particles of normal sodium orthophosphate, and a small quantity of particles of hydrated normal trimagnesium orthophosphate pentahydrate, which is active to prevent in its immediate vicinity the formation of an adhesive substance which is the cause of caking, said adhesive substance being normally formed by interaction between silica and alkaline compound derived from particles of the said normal sodium orthophosphate.

CHARLES S. KING.

REFERENCES CITED

The following references are of record in the file of this patent:

UNITED STATES PATENTS

| Number | Name | Date |
| --- | --- | --- |
| 2,130,869 | Block et al. | Sept. 20, 1938 |
| 2,370,472 | King | Feb. 27, 1945 |